(12) United States Patent  
Carter (10) Patent No.: US 7,309,113 B2
(45) Date of Patent: Dec. 18, 2007

(54) FLOW CONTROL SYSTEM FOR A VALVE

(75) Inventor: Stephen A. Carter, Calgary (CA)

(73) Assignee: Dynetek Industries Ltd., Calgary (CA)

( * ) Notice: Subject to any disclaimer, the term of this patent is extended or adjusted under 35 U.S.C. 154(b) by 31 days.

(21) Appl. No.: 10/989,350

(22) Filed: Nov. 17, 2004

(65) Prior Publication Data
US 2005/0103382 A1   May 19, 2005

Related U.S. Application Data

(60) Provisional application No. 60/520,679, filed on Nov. 18, 2003.

(51) Int. Cl.
*B60T 8/36* (2006.01)
*F16K 31/12* (2006.01)

(52) U.S. Cl. .................. 303/119.1; 303/1; 137/505

(58) Field of Classification Search ............. 303/119.1, 303/119.2, 1; 137/505, 505.13, 861, 877
See application file for complete search history.

(56) References Cited

U.S. PATENT DOCUMENTS

| | | | |
|---|---|---|---|
| 2,989,067 A | 6/1961 | Perle | |
| 3,511,266 A | 5/1970 | Phlipot | |
| 3,848,934 A * | 11/1974 | Grosseau | 303/119.2 |
| 5,027,871 A | 7/1991 | Guenther | |
| 5,678,602 A | 10/1997 | Cannet et al. | |
| 5,921,281 A * | 7/1999 | Takayama et al. | 137/625.65 |
| 6,041,762 A | 3/2000 | Sirosh et al. | |
| 6,286,543 B1 | 9/2001 | Davidson | |
| 6,398,182 B1 | 6/2002 | Stephenson | |
| 6,484,750 B1 | 11/2002 | Foos et al. | |
| 6,540,204 B1 | 4/2003 | Carter | |
| 6,568,375 B2 | 5/2003 | Ishikawa et al. | |
| 6,615,865 B1 | 9/2003 | Eusebi | |
| 6,644,345 B2 | 11/2003 | Dulin | |
| 6,651,686 B2 | 11/2003 | Scantlin et al. | |
| 6,672,332 B2 | 1/2004 | Carroll | |
| 6,675,831 B2 | 1/2004 | Sakguchi et al. | |
| 6,740,827 B1 | 5/2004 | Liantonio | |

* cited by examiner

*Primary Examiner*—Melody M. Burch
(74) *Attorney, Agent, or Firm*—Sean W. Goodwin (57) ABSTRACT

A fluid-flow control system for a valve comprises a valve body and a bi directional main flow passage between a first and second fluid areas. The shuttle piston having a first face in direct communication with the second area and a second face in communication therewith through a bleed orifice. The second face is alternately exposed to the first fluid area through a backpressure passage and second orifice which alters the pressure differential across the shuttle piston. A second valve such as a solenoid operates to either close the second orifice wherein the shuttle piston is operable under differential pressure between the first and second pressure areas, or to close the second orifice wherein the shuttle piston is operable under differential pressure between the second pressure area and the backpressure passage. Filters at the fluid inlet and outlets protect the sealing components therein.

27 Claims, 8 Drawing Sheets

FLOW CONTROL SYSTEM FOR A VALVE

CROSS REFERENCE TO RELATED APPLICATION

This application is a U.S. patent application claiming priority of U.S. Provisional Patent application Ser. No. 601520,679, filed Nov. 18, 2003, the entirety of which is incorporated herein by reference and further is related to co-pending U.S. application 10/989,308 filed Nov. 17, 2004, which also claims priority of the same U.S. Provisional application 60/520,680, the entirety of which is also incorporated herein by reference.

FIELD OF THE INVENTION

The invention relates to the control of bi-directional flow through a valve under high and low pressure and flow conditions. More particularly, a valve is provided for controlling filling and discharging gas from a cylinder.

BACKGROUND OF THE INVENTION

Valves for controlling the flow of gases can be subjected to extremely demanding performance expectations. In particular, on-off solenoid valves are expected to provide leak-tight sealing when closed and to respond quickly when between on and off. Challenges to such seemingly innocuous operation include contaminants which affect sealing, differential pressure across the valve which may vary widely, seal life and in the case of a valve for a gas cylinder, the avoidance of overfilling. Problems associated with sealing are exacerbated when at high pressures and with low molecular weight gases.

In more detail, while flow-limiting orifices in such systems can be 0.250" (6.35 mm) in diameter and larger, prior art designs are expected to provide leak-tight sealing when closed, with the maximum allowable leak often, under some regulatory guidelines, being equivalent to a 5 $\mu$-in hole. At the same time, contaminants routinely found in the fluid flow stream may be 10,000 times or more that that size. Such contaminants can come from various sources. In fuel gases as a typical example, contaminants may come from debris in lines at the fuel process plant; scale in the fuel distribution pipelines; debris from the installation of tubing and fittings in the application system's plumbing; and debris inside the storage cylinders left over from their original manufacture.

Currently available prior art systems do not address the issue of contaminants being present in the flow and thus are prone to erratic performance in the field.

On-off solenoid valves for high pressure operation are typically of the pilot-operated type. That is, a direct acting solenoid opens a small orifice, being typically 0.010" to 0.030" in diameter, which provides a small pilot flow. The pilot flow serves to charge the downstream system, slowly raising the pressure therein to the supply pressure. When the downstream pressure has nearly reached the supply pressure, a second stage of the solenoid is able to open, allowing the primary flow orifice, being typically 0.156" to 0.250" in diameter, to provide normal, full-flow rates. At high supply pressures and with smaller system volumes, the delay time from pilot flow to full flow is substantially indiscernible. However, at low supply pressures, for example less than 500 psig, the delay time becomes significant and can often reach 30 seconds or more. Such delays are not tolerable in many applications, such as automotive applications. Accordingly, it is desirable to have a system with little delay, regardless of supply pressure, downstream pressure and flow demand conditions.

As noted above, many applications for on-off solenoid valves are increasingly likely to demand leak-tight sealing across the system's entire pressure range, for example 7 to 350 bar. In some applications, the maximum allowable leak rate may be created by a leakage path equivalent to a 5 $\mu$-in (0.127 micron) hole. Accordingly, conventional seal materials and configurations are often unable to reliably deliver the required performance. This is especially true for smaller molecule gases and higher operating pressures.

Such on-off valves are commonly required to have a manual override valve which can prevent both the filling and withdrawal of fluid from a cylinder, regardless of the solenoid's state. Currently, valves with rather common plastic seats and poorly matched operators are used in practice. The two most common types of valves have either overly large or seriously undersized operators. The oversized operators are bulky, expensive and can easily cause seal damage with seemingly reasonable torque levels. The undersized operators are themselves easily damaged and can have difficulty in transmitting enough torque to reliably open and close the valve. Further, conventional valves using prior art seals made from the PTFE class of materials may be prone to seal extrusion and failure at high differential pressures.

In some gaseous fast-fill applications, achieving a proper fill level can be difficult using conventional valves and seals. As the heat of compression briefly raises the in-cylinder pressure, the cylinder must be over-filled so that once equilibrium temperatures have been restored the cylinder will have the desired pressure. In a similar situation, the same gas may be stored at a variety of pressures, depending on the cylinder type and application. Preventing over-filling and over-pressurizing a cylinder is desirable.

SUMMARY OF THE INVENTION

In one embodiment of the invention, an on-off, fluid-flow control system is provided which can be manually or electrically actuated. The system comprises an inlet filter, a manual shut-off valve, a direct acting high pressure solenoid, a pneumatically operated shuttle valve, a withdrawal filter and an optional pressure sensor. The solenoid and shuttle valve act together, forming a fast-response high-flow on-off device, with opening times substantially independent of inlet and outlet conditions. Calibration of the solenoid's orifice and return spring system allows the system to prevent over-pressurizing a cylinder. Calibration of the shuttle valve component's dimensions and return spring allows the system to provide an automatic low-pressure shut-off. Use of an optional pressure sensor allows conventional system electronics to stop cylinder filling when a desired pressure is reached. The dual inlet and withdrawal filters ensure that the precision sealing system can operate in the presence of fluid contamination levels.

In one illustrative context, the system is part of a valve installed between a fluid storage cylinder and a fluid distribution system, however the concept is equally applicable to in-line or remote valves more generally. The shuttle valve and solenoid can also employ a sealing system capable of providing leak-free sealing over a wide range of temperatures and pressures. The flexible sealing system integrates either a ball bearing or a ball-nosed shape into the solenoid's piston and the shuttle valve. In the no-flow condition, the ball rests on and seals against the inside diameter of a sealing washer. Specific application requirements to handle various fluids, pressures, temperatures, flow rates, life expectancies and costs can be simply accommodated by changing the ball's features, including material, diameter, sphericity, surface finish, and coatings, as understood by those of skill in the art.

More particularly, and in response to various issues identified in the prior art, in one embodiment, the issue of contaminants is addressed by integrating separate fill and withdrawal filters into the system. The fill filter removes particulates before they enter the valve. The withdrawal filter removes any particulates before gas stored in the cylinder is allowed to re-enter the valve. Thus, critical sealing surfaces are kept free of contaminants which could prevent them from sealing.

In another embodiment of the invention, the issue of delay from pilot flow to full flow is addressed by using a pneumatically-controlled shuttle valve to control the primary flow. A small-orifice, direct-acting solenoid controls the differential pressure across the shuttle valve. When the solenoid is opened, it causes a full input-output differential pressure to appear across the shuttle valve, opening it very quickly and is essentially independent of downstream pressure.

Further embodiments of the invention can address the sealing capability by using a piston having a spherical-nose sealing on the internal diameter of an accurately produced sealing ring as disclosed in a co-pending U.S. application Ser. No. 10/989,308 filed on or about Nov. 17, 2004 and claiming priority of U.S. Provisional application No. 60/520,680 filed Nov. 18, 2003, the entirety of which is incorporated herein by reference. The seal is nominally a ball of the spherical nose seated on a circle rather than on a lip surface. The unique sealing approach can be used for both the shuttle valve and the solenoid. With corresponding and appropriately accurate piston guidance and the use of commercial ball bearings for the sealing surfaces, very reliable systems are demonstrated.

Additional embodiments of the invention address the issue of seal damage through the use of a polyimide seal material which is relatively strong, has neither cold flow nor extrusion behavior, and can resist extreme levels of over-torque. Further, by shrouding or jacketing the outside diameter of the seal insert with a metal sleeve, tolerable torque levels of the seal insert exceed the strength of the operator. For example, a 7 mm hex operator would fail before the seal face is damaged. Notably, the operator damage occurs at a torque level more than 5 times the maximum needed to affect a complete seal.

Further embodiments of the invention address the proper fill pressure issue in two ways. Firstly, the calibration of the solenoid's orifice diameter and return spring force provide for over-pressure shut-off during certain fast-fill situations. That is, if the solenoid is presented with a differential pressure above its calibrated limit, the solenoid will automatically lock the shuttle valve closed, limiting filling to a low rate, being typically ≦0.1% of normal, which can pass through the system's bleed orifice. Hence, the automatic aspect is not available for slow fill situations where there is never any large instantaneous change in pressure. The second method is applicable for slow and fast fill situations. The controller monitors an optional pressure sensor and energizes the solenoid when the desired pressure is reached. Once the solenoid is energized, the shuttle valve is locked closed and filling is reduced to a bleed rate level, for example at least a 99.9% reduction in filling rate.

Thus in one broad aspect a flow control system for a valve comprises a valve body having a main flow passage connecting a first opening in communication with a first pressure area to a second opening in communication with a second pressure area; a first valve with a shuttle piston having a first face in communication with the second pressure area through the main flow passage, a first seal at the first face which is operable to open and close the main flow passage, and a second face in communication with the second pressure area through a first orifice, the shuttle piston being biased to close the main flow passage and operable under differential pressure across the first and second faces to open the main flow passage; a backpressure passage extending between the first opening and the shuttle piston's second face; and a second valve operable between opening and closing the second orifice wherein when the second orifice is closed, the shuttle piston is operable under differential pressure between the first and second pressure areas, and when the second orifice is open, the shuttle piston is operable under differential pressure between the second pressure area and the backpressure passage.

In a particular embodiment, wherein the first pressure area, such as a fluid distribution system, is at a high pressure which is greater than a low pressure at the second pressure area, such as a cylinder, for directing flow from the first opening to the second opening, such as to fill the cylinder, then when the second orifice is closed, the differential pressure across the first and second faces opens the first valve enabling flow along the main flow passage, and when the second orifice is open, the backpressure passage and the second face equilibrate to the high pressure and the first face remains at the lower pressure, disabling flow along the main flow passage. The second valve can be pressure-actuated to overcome inherent biasing within or can be solenoid operated to open the second orifice.

In an converse case, wherein the first pressure area or fluid distribution system is at a low pressure which is less than a high pressure at the second pressure area or cylinder for withdrawing fluid from the second opening to the first opening, then when the second orifice is closed, pressure at both the first and second faces is high pressure and the first seal is biased closed for disabling flow along the main flow passage, and when the second orifice is open, the backpressure passage and the second face equilibrate to an intermediate pressure between the high pressure in the second pressure area and the low pressure in the first pressure area while the first face remains at the high pressure for establishing a pressure differential across the first and second faces for enabling flow along the main flow passage.

BRIEF DESCRIPTION OF THE DRAWINGS

FIGS. 7-12 are cross-sectional views of the embodiment of FIG. 1 illustrating various flow conditions, including:

DETAILED DESCRIPTION OF EMBODIMENTS OF THE INVENTION

Embodiments of a flow control system for a valve are illustrated in the context of an in-cylinder control valve. Often a pressure regulator is also associated with the valve but is not illustrated in this case for a matter of some clarity. Further, the system is equally applicable to in-line remote valves which are not directly attached to the cylinder. Fluid under various pressure conditions from a first pressure area is directed bi-directionally to and from a second pressure area at various pressure conditions. In the particular embodiment shown, fluid is directed through the valve, into the cylinder (such as to fill the cylinder for storage) and withdrawn through the valve (such as for use or consumption).

Figure 1:
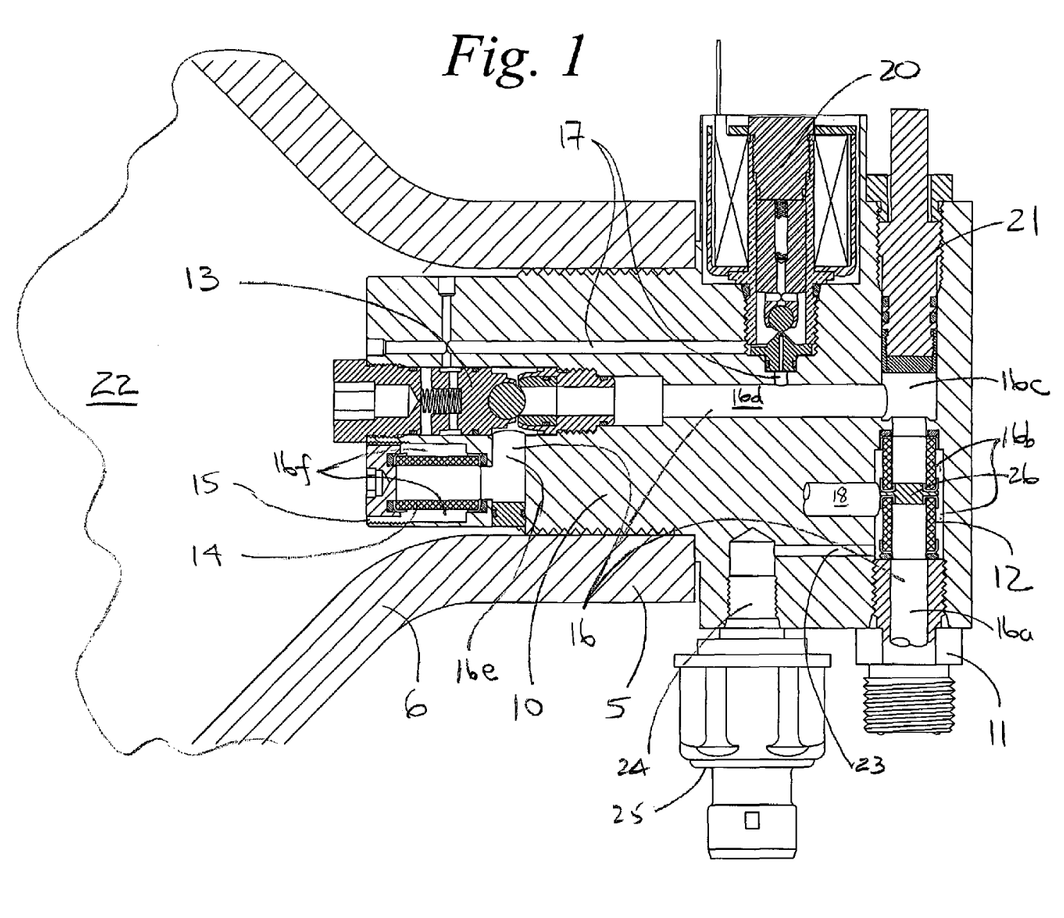
FIG. 1 is a cross-sectional view of one embodiment of the invention installed in a pressure cylinder.

With reference to FIG. 1, a flow control system is embodied in a valve body 10 installed in a structure such as the neck 5 of a high pressure cylinder 6. The valve body 10 comprises a first opening or inlet 11, an first inlet filter 12, a shuttle valve 13, and a second withdrawal filter 14 at a second opening or cylinder outlet 15. In the context of an in-cylinder valve, the inlet 11 alternates between acting as a fluid inlet from a first pressure area, such as a higher pressure source, during filling of a lower pressure second pressure area or cylinder, and acting as a fluid outlet during emptying of the cylinder in the case that the second pressure area of the cylinder is the higher of the two pressures.

A bi-directional main flow passage 16 extends between the inlet 11, through the inlet filter 12, to the shuttle valve 13, and through the withdrawal filter 14 to the outlet 15 and into the cylinder 6. The shuttle valve 13 is positioned in the main flow passage 16 intermediate the inlet 11 and the outlet 15. A second valve such as a direct acting high pressure solenoid valve 20 controls communication between the main flow passage 16 and a backpressure passage 17. The solenoid valve 20 alternately blocks and opens communication between main flow passage 16 at a point between the inlet 11 and the shuttle valve 13 at the backpressure passage 17 for communication with the shuttle valve 13.

A manual valve 21 is situated in the valve body's main flow passage 16, downstream of the inlet filter 12 for manually and alternately blocking the main flow passage 16.

From the inlet 11 to the cylinder outlet 15, the main flow passage 16 comprises a valve body inlet port 16a, a first filter annulus 16b and a filtered gas primary passage 16c at the manual valve 21. The primary passage 16c also acts as the seal bore for the manual valve 21 and leads to transfer passage 16d. The shuttle valve 13 is operable between open and closed positions to alternately open and block flow between transfer passage 16d and withdrawal filter inlet chamber 16e to a bore of the second filter 14. A second filter annulus 16f communicates with the second access port 15 and a high pressure area 22 of the cylinder 6.

In the context of the in-cylinder-mounted valve 10, gas at the inlet 11 is communicated, via channel 23, to sensor port 24 which houses an optional pressure sensor 25 for reading gas pressure at the inlet 11 at all times.

The inlet filter 12 is tubular having a bore and is fit in the inlet 11 to form a first filter annulus 16b about the inlet filter 12. The inlet filter 12 has a barrier 26 formed intermediate therealong its bore and thus gas at the inlet 11 is directed by the barrier 26 to pass from inlet port 16a, through the filter 12 and into the first filter annulus 16b. Filtered gas from the first filter annulus 16b is further directed back around the barrier 26, and through the filter to primary passage 16c, being stripped of particulates. Optionally, the filtered gas can also be delivered from the filter annulus 16b to a secondary channel 18 to the inlet of a regulator section (regulator not shown in this embodiment). In a simple on-off valve, passage 18 is omitted.

If the manual valve 21 is open, gas passes from primary passage 16c to transfer passage 16d and enters the shuttle valve 13.

In cases where a high supply pressure at the inlet 11 greater than a low storage pressure in the cylinder 6 for filling the cylinder with gas, the shuttle valve 13 is opened by the differential pressure across the valve and gas can reach withdrawal filter inlet chamber 16e. Fill gas flows from the withdrawal filter inlet chamber 16e and into the filter 14, exiting radially through the filter to the second filter annulus 16f, discharges through outlet 15 and into the cylinder high pressure area 22.

Figure 2:
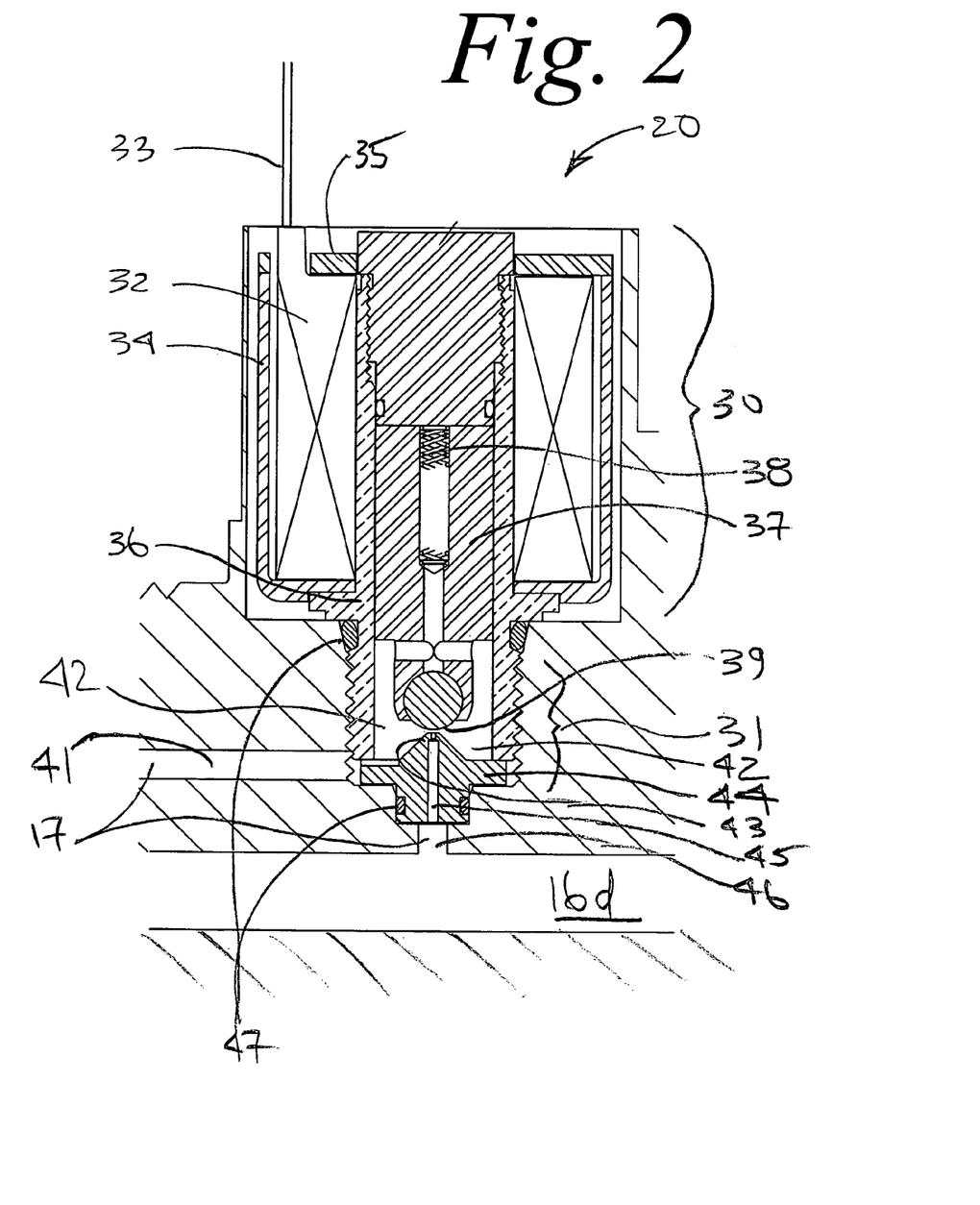
FIG. 2 is a close-up view of a solenoid valve portion of the valve of FIG. 1.

With reference to FIG. 2 the solenoid valve 20 is illustrated in greater detail. Solenoid valve 20 is a direct acting high pressure solenoid valve comprising two major sub-assemblies: the operator 30 and the orifice system 31. Operator 30 comprises a solenoid coil 32, having electrical terminals 33, a coil cover 34 and a flux washer 35. Both the coil cover 34 and a flux washer 35 are made of magnetic steel and act to provide magnetic flux having a low resistance return path. A core tube 36 is made of a non magnetic metal and houses piston 37 which is magnetic. Return spring 38 is located in a bore in the center of piston 37 and acts to urge the piston 37 towards its closed position when the coil 32 is de-energized. Piston 37 also includes a ball-bearing 39 forming a valve seating face. By selecting the appropriate size, grade and material for the ball bearing, the needs of each specific design can be accommodated. Notably, ball bearings are high volume production items available in a wide variety of sizes, grades and materials. As a result, the surface geometry and finish can be improved by more than a 10:1 factor by using ball bearings versus conventional machining (i.e. turning). As an example, for 350 bar hydrogen, the ball bearing 39 may be made from virgin polytetrafluoroethylene (PTFE) or acetyl homopolymer or similar, appropriate engineering plastic.

As shown in FIG. 2, orifice system 31 is positioned intermediate along the backpressure passage 17. When open, the orifice system enables communication between a first end solenoid inlet port 46 at the transfer channel 16d of the main passage 16 to a backpressure port 41 in communication with the backpressure passage 17 and a backpressure side of the shuttle valve 13. The backpressure port 41 communicates through a solenoid chamber 42, a metering orifice 43 formed in an orifice insert 44, an orifice passage 45 and the solenoid outlet port 46. The orifice insert 44 is clamped in place between the core tube 36 and the valve body 10. O-rings 47 or other sealing means prevent leakage around the orifice insert 44.

In some embodiments, where ball bearing and face 39 is PTFE, the orifice insert 44 is made from brass or other metal. However, in other embodiments, the ball bearing 39 may be a hard metal, such as stainless steel or carbide and the orifice insert 44 may be a polyimide plastic. As described in greater detail in co-pending application Ser. No. 10/989,308, the seating surface at the orifice 43 is a preferably a sharp edged ring opening formed at the intersection of the orifice insert's flat upper surface and the small through bore of the orifice. If the intersection were increasingly rounded or chamfered, the ability of the ball to predictably seal would be reduced.

Figure 3:
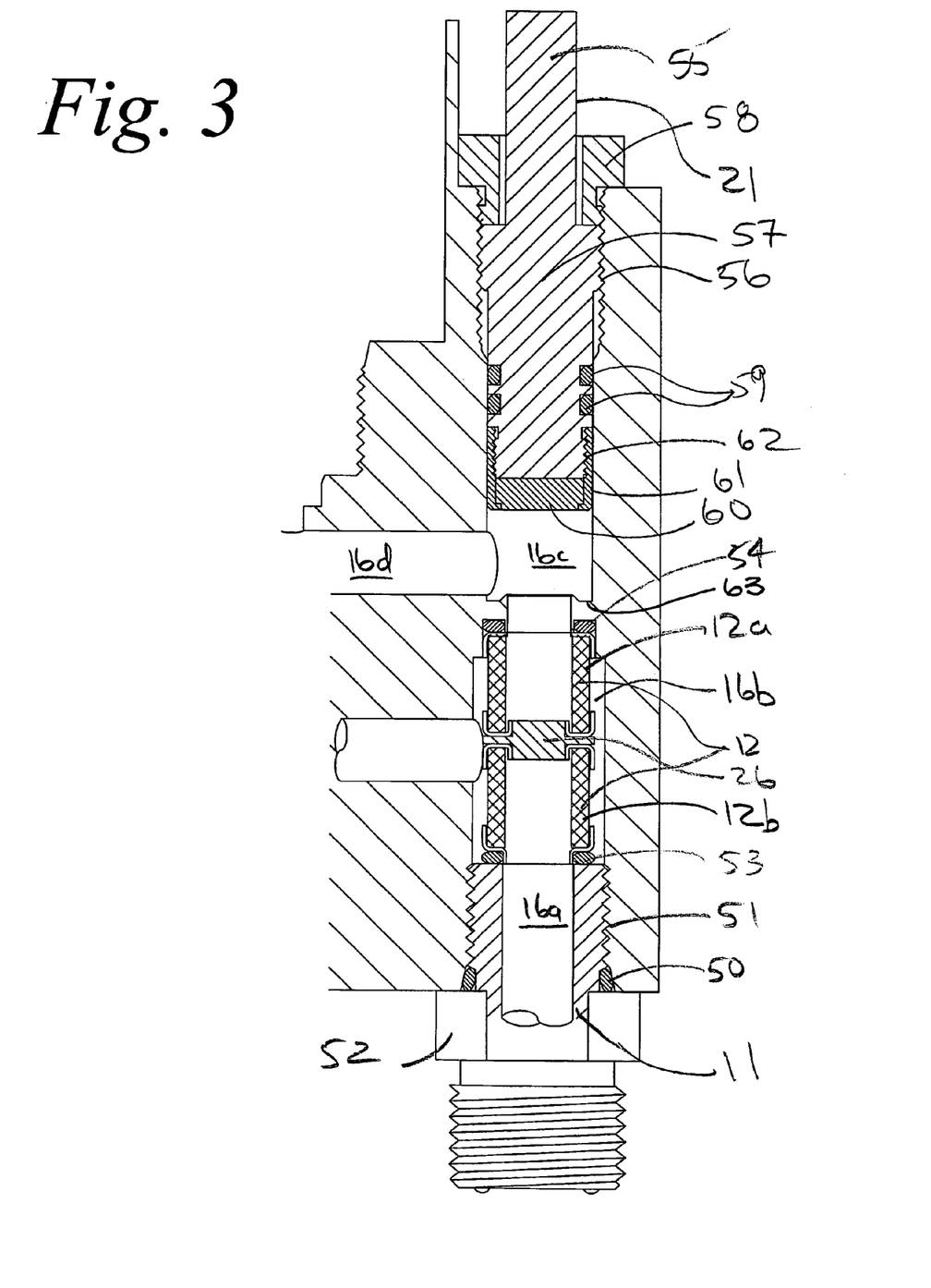
FIG. 3 is a close-up view of an inlet/outlet and a manual shut off valve of the valve of FIG. 1.

With reference to FIG. 3 regarding the inlet filter 12, inlet fitting 11 is housed in inlet port 16a, sealed by O-ring 50 or other suitable means, retained by threads 51 and tightened by hex head sector 52 or other suitable shape. As shown, filter 12 is comprised of first and second filter elements 12a,12b coupled by the barrier 26 or blind coupling. Thus, gas passes through the first filter 12a and enters first filter annulus 16b. Fill gas continues to flow through the second filter 12b, the gas being filtered a second time, to reach primary passage 16c. O-rings 53 and 54 at either end of filter 12 prevent contaminants from by-passing the filter elements 12a, 12b.

If the manual valve 21 is open, clean gas passes through the primary passage 16c in to the transfer passage 16d.

If manual valve 21 is closed, clean gas cannot reach chamber 16e and thus cannot fill the cylinder 6. Similarly, with manual valve 21 closed, gas cannot be removed from the cylinder. Manual valve 21 is opened and closed via an operator 55, which may be either a male or female type (e.g. a hex socket). As shown, the operator 55 is a 7 mm hex stub.

Motion of the manual valve 55 is controlled by the pitch of threads 56 on the valve stem 57. Accidental removal of the valve 55 is prevented by packing nut 58. O-rings 59, in suitable glands, prevent contained gas from leaking externally about the valve 55. A conventional elastomeric seal 60 is retained to the stem 57 by a retaining sleeve 61 having a transverse lip all of which is secured by retaining threads 62. Alternatively, the seal 60 may be clinched in a one-piece tubular valve body by rolling a transverse lip over the seal. The seal 60 cooperates with an annular seat 63. As shown, retainer sleeve 61 substantially completely jackets the seal 60. Thus, even at extremely high closing torques, such as torques created by operator abuse, the seal 60 is merely in compression. The jacketing action of the retaining collar 61 prevents the material of the seal 60 from being displaced radially outwards by the seat against which it is forced, thus preventing cracking of the seal 56. Seals 60, manufactured from a polyimide material such as Dupont Vespel SP-1®, have been shown to tolerate torques more than 5 times that required to affect a perfect seal.

Figure 4:
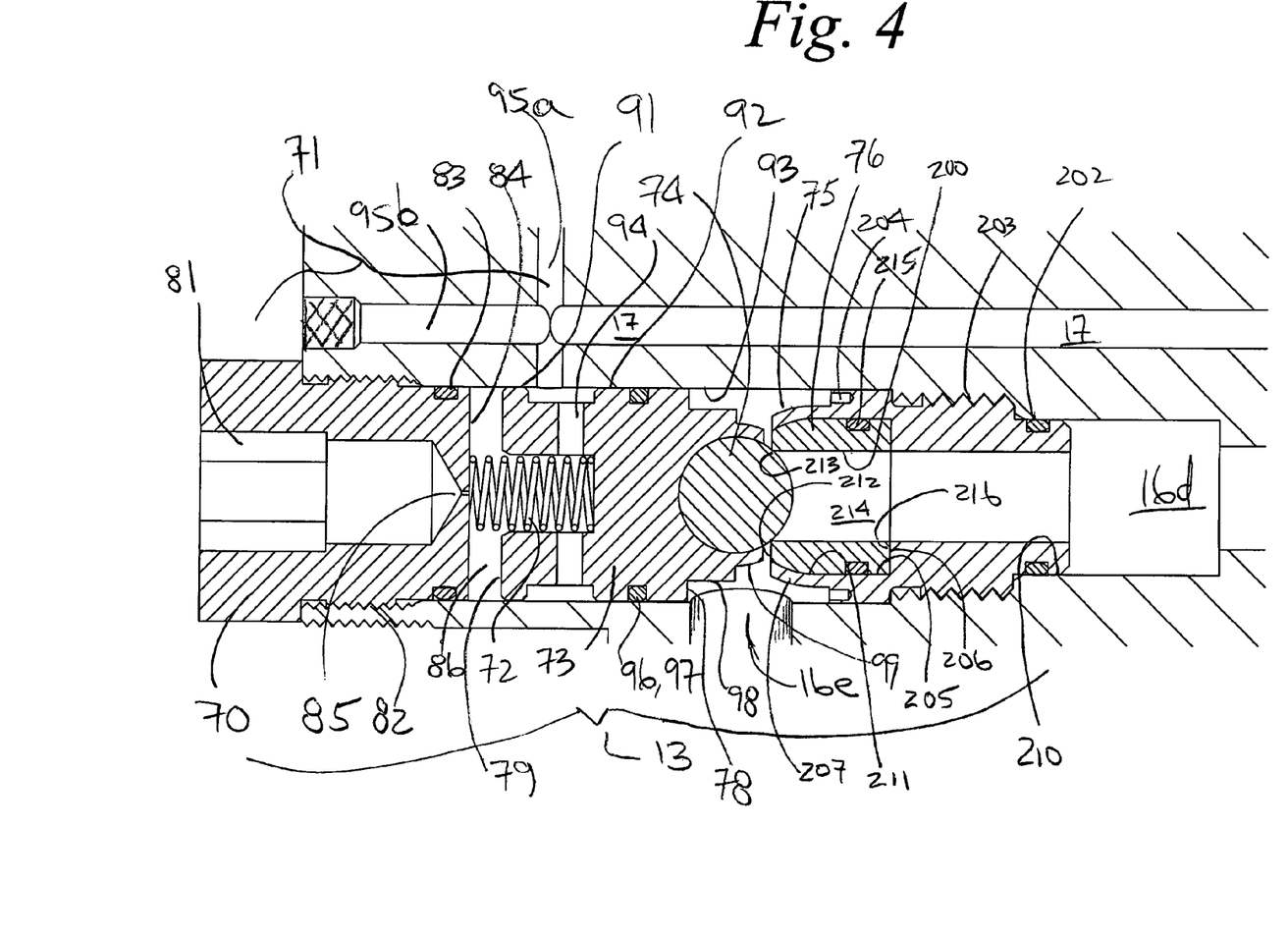
FIG. 4 is a close-up view of a shuttle valve portion of the valve of FIG. 1.

With reference to FIG. 4, the shuttle valve 13 comprises a bleed plug 70 installed in a shuttle vent 71 communicating with the pressure zone 22 of the cylinder 6. The shuttle valve 13 further comprises a return spring 72, a shuttle piston 73, a ball-bearing seal face 74, a seal carrier 75 and seal seat 76. The shuttle piston 73 has a first face 78 in communication with main flow passage 16 between the seal face 74 and the cylinder 6 and a second face 79 in communication with the shuttle vent 71.

Bleed plug 70 comprises a tightening means 81 such as a hex socket, threads 82 for retention, an O-ring 83 or other suitable sealing means, a flat face 84 to provide a full flow positive stop for the shuttle 73, and a bleed orifice 85. In an embodiment of the invention having a 0.012 in. solenoid orifice, the bleed orifice 85 might be 0.006 in., or a 4:1 flow capacity ratio. Bleed orifice 85 allows the shuttle piston 73 to close once the solenoid valve 20 closes allowing the cylinder pressure to re-establish itself on the backpressure passage 17; that is the return spring side 86 of the shuttle piston 73 in communication with the backpressure passage 17 and vent 71. Once the tank pressure is re-established, substantially no differential pressure (between the main passage 16d and backpressure passage 17) exists across the shuttle piston 73 and the return spring 72 can force the shuttle 73 to a closed or no-flow position. Decreasing the size of orifice 85 speeds opening and slows closing of the shuttle piston 73. Thus, the selection of return spring size and orifice size is an available calibration tool to meet the requirements of specific applications. As an example, the system can be calibrated so that the shuttle will not open below a pre-selected pressure, such as 2 bar, ensuring that the fluid will not leak out, and similarly that atmospheric or other contaminants will not enter the cylinder 6.

Shuttle piston 73 has two sliding surfaces 91 and 92, which serve to keep the shuttle piston 73 centered in bore 93. The shuttle piston 73 typically has 0.002 in of diametral clearance in the bore. Cross drilling 94 through the shuttle piston 73 intersects a pocket housing the spring 72 and ensures that fluid displaced by the shuttle's motion occurs without restriction. Further, the cross drilling 94 places the return spring side 86 in fluid communication with the shuttle vent system 16 and backpressure passage 17 thru cross drilling 95a and axial drilling 95b. O-ring 96, contained in dynamic O-ring gland 97, ensures that the only fluid communication with the return spring side 86 is thru the bleed orifice 85. A reduced diameter 98 on the flow side of the shuttle piston 73 serves to reduce flow restriction. A thin section 99 of the body of the shuttle piston 73 is rolled over ball bearing 74, permanently clinching it therein. In an embodiment used for high pressure gases, the ball 74 is made from 440 stainless steel or tungsten carbide. In less demanding applications, a sealing equivalent to the ball bearing might be machined directly into the shuttle piston 73. Due to high velocity impacts of the shuttle piston 73 against bleed plug 70 on opening, the shuttle piston 73 is made from an appropriate metal, such as brass, rather than a plastic. Due to the tight fit in bore 93, the coefficients of thermal expansion between the shuttle piston 73 and its bore 93 must be coordinated thus making most plastics inappropriate.

Figure 5:
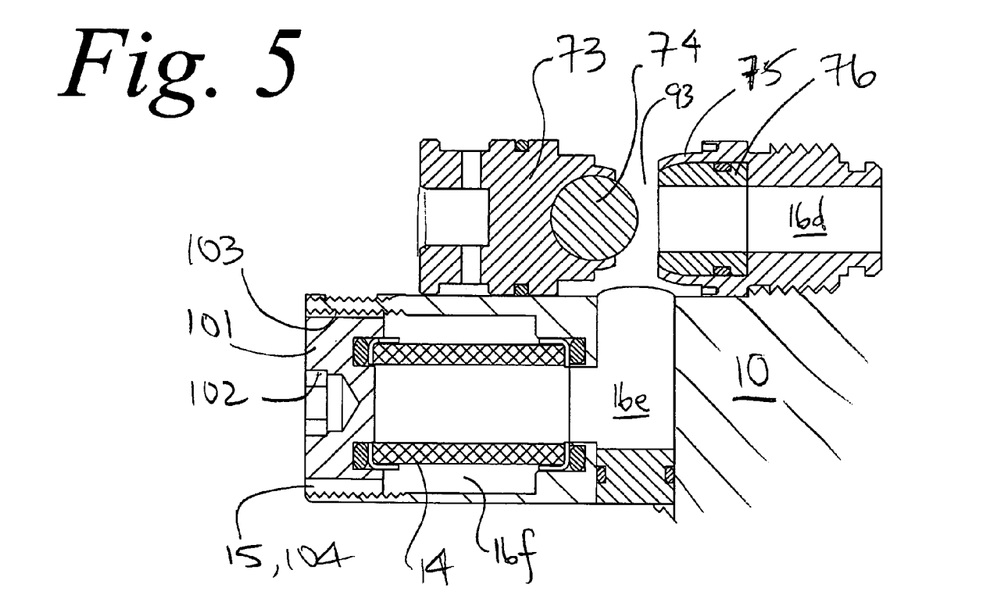
FIG. 5 is a close-up view of an in-cylinder filter portion of the valve of FIG. 1.

With reference to FIG. 5, the fluid withdrawal portion of the valve comprises the withdrawal filter 14 which serves to filter fluid being withdrawn from the cylinder 6. Particulate debris native to the cylinder 6 cannot enter the valve and endanger its sealing system. For example, a particulate of 0.002 in. (50 microns) in size, which is invisible to the unaided eye, is large enough to cause a gross high-pressure gas leak if wedged between cooperating male and female sealing surfaces. The filter system also acts to filter the fill gas before it enters the cylinder.

Filter 14 has two bi-directional inlet/outlet channels: withdrawal filter inlet chamber 16e, which is in fluid communication with shuttle valve 13 and second filter annulus 16f which is in fluid communication with the cylinder's high pressure interior 22. The filter 14 is retained in the valve body by a filter retainer 101 which has a hex socket 102 or other suitable means for tightening, threads 103 for retention, and one or more outlet passages 104 which form the cylinder outlet 15 for providing fluid communication between the interior 22 of the cylinder 6 and the filter annulus 16f which surrounds filter 14. During withdrawal, fluid from the cylinder enters filter annulus 16f then passes through filter 14, being cleaned thereby. Solid particulates temporarily reside on the outside diameter of filter element 101 and/or accumulate in the filter annulus 16f. During the next filling event, any such particulates are predictably swept back into the cylinder's interior 22 by the high velocity fill gas. Upon being filtered at filter 14, the withdrawal gas reaches the filter's interior which is in fluid communication with withdrawal filter inlet chamber 16e, from which the withdrawal gas enters the shuttle's bore 93. If shuttle piston 93 is open (as shown), the gas proceeds through the center of seal seat 76 and passes into the transfer passage 16d of main passage 16. If manual valve 21 is open, as shown in FIGS. 1 and 3, the gas reaches the primary passage 16c and is available for withdrawal use.

Figure 6:
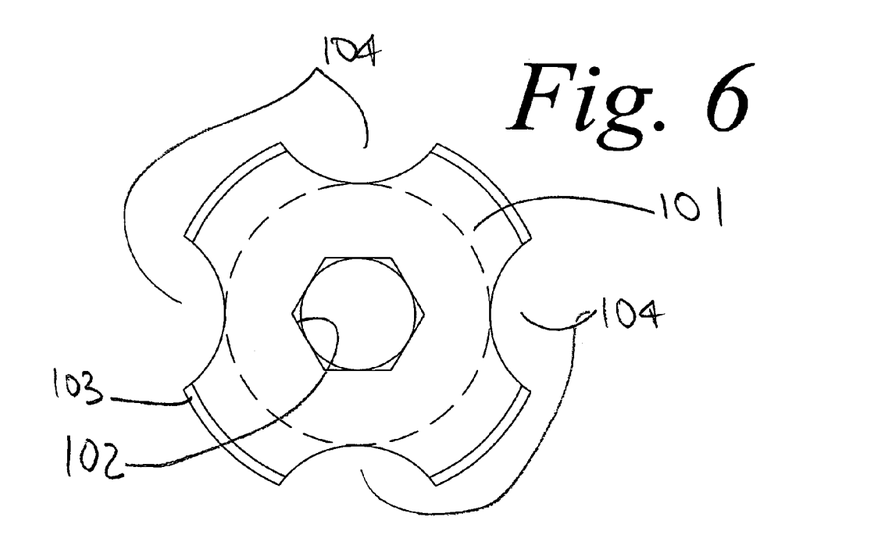
FIG. 6 is an end view of the in-cylinder filter retainer according to FIG. 5.

In typical gaseous applications, depending on the expected cleanliness of the gas and application requirements, the pore size of filter 14 may be in the 0.2 micron to 40 micron range. As pore size decreases, the length of filter element 101 is increased in order to maintain acceptable differential pressures during filling. In the embodiment as shown, the filter size is appropriate for gases, having a filter media being wire mesh and a filtering size of 30-40 micron. A larger filter is required for smaller pore sizes and for other media such as sintered metal or paper. In such cases, the retainer 101 is merely lengthened to extend into the cylinder cavity and radial inlet/outlet holes are added to the elongated body (not shown). FIG. 6 provides an end view of retainer 101 more clearly illustrating the outlet passages 104.

Turning now to FIGS. 7 to 12, flow control through the valve of the embodiment of FIG. 1 is illustrated throughout various stages and conditions of operation. For convenience, the embodiment of FIG. 1 is set forth in FIG. 7 with the pertinent flow passages and components identified to the exclusion of some details.

Figure 7:
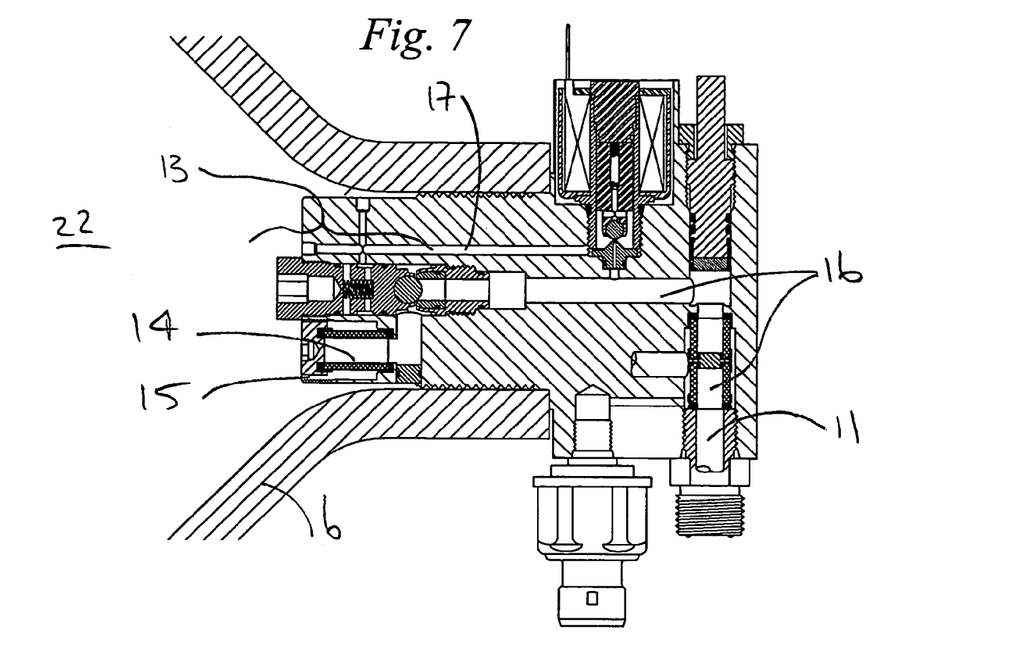
FIG. 7 illustrates the valve at rest.

In FIG. 7, the valve body 10 of a flow control system is illustrated installed in a cylinder 6 and comprises a gas inlet 11 having an inlet filter 12. The main flow passage 16 connects the inlet 11 to the shuttle valve 13 and thereafter to the withdrawal filter 14 at the cylinder outlet 15. Differential pressure across the shuttle valve is managed through the backpressure passage 17 extending between the main flow passage 16 and the shuttle valve 13. The solenoid valve 20 controls the operation of the backpressure passage 17.

FIG. 7 can represent also represent a case in which high pressure (HP) exists in the cylinder and a lower pressure (LP) exists at the inlet 11. High pressure exists at both the first and second faces 78,79 of the shuttle piston 73 and thus the spring bias keeps the shuttle valve closed.

Figure 8:
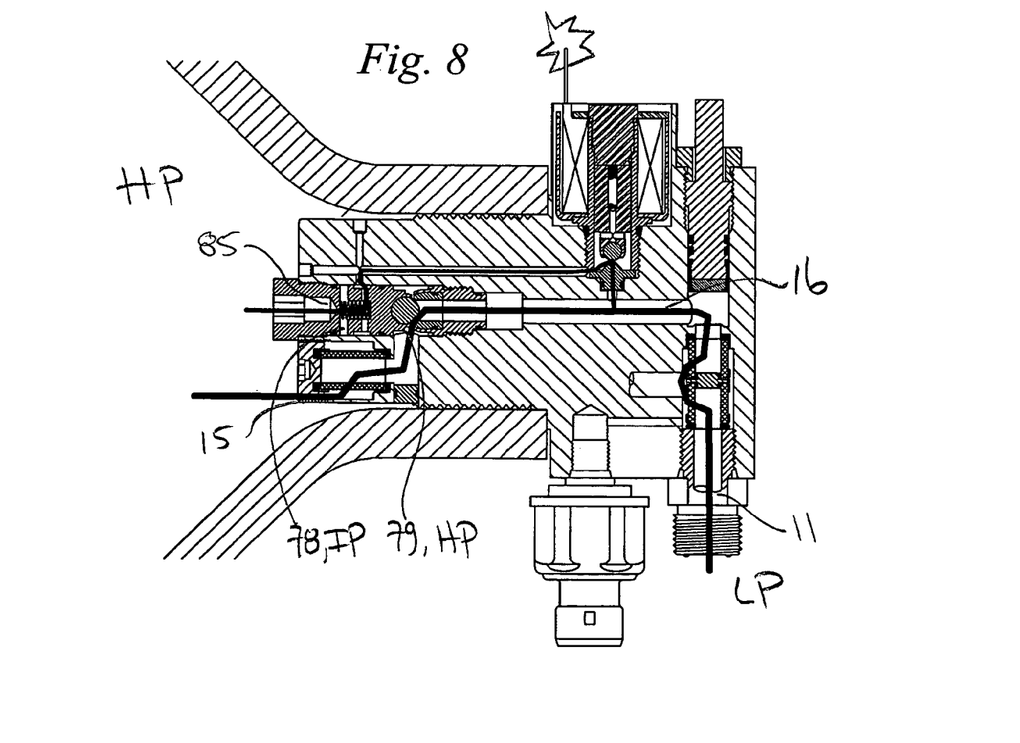
FIG. 8 illustrates the valve during normal fluid withdrawal from the cylinder with an active shuttle.

With reference to FIG. 8, a case is presented in which high pressure exists in the cylinder and a lower pressure exists at the inlet 11. This is a case typically where gas in the cylinder 6 is to be withdrawn for use. The shuttle valve 13 is initially closed as shown in FIG. 7 and gas cannot flow along the main flow passage 16. A low pressure exists at the inlet 11 and transfer passage 16c, and a high pressure exists at the cylinder 6. When fluid withdrawal state is initiated, solenoid valve 20 opens the transfer passage 16c to the backpressure passage 17 and serves to reduce the pressure on the second face 79 and backpressure side 86 of the shuttle piston 73 to some intermediate pressure (IP) through the shuttle vent system 71. Specifically, and also with reference again and as well to FIGS. 2 and 4, the backpressure side 86 is in fluid communication with solenoid valve 20 through cross drilling 94 (FIG. 4) and cross drilling 95a which lead to the backpressure passage 17. Once the solenoid valve 20 is open, that fluid path is further connected to the transfer passage 16c via the solenoid's control orifice 43 (FIG. 2). In a normal fluid consumption state, the flow demand on withdrawal from the cylinder 6 and flow out of the backpressure passage 17 through control orifice 43 exceeds the capability of bleed orifice 85 (FIG. 4) to re-fill the backpressure passage 17. Thus the backpressure passage 17 and backpressure side 86 remain at the intermediate pressure less than the pressure in the cylinder and at the shuttle piston's first face, enabling the shuttle valve 13 to operate under differential pressure.

If the flow demand is very low, bleed orifice 85 then becomes capable of meeting or exceeding the demand, and the pressure at cross drilling 94 is no longer reduced from the pressure in the cylinder. Thus, the shuttle valve 13 remains spring-biased closed. It can be appreciated that the flow demand that can be met by bleed orifice 85 alone is proportional to cylinder pressure. Thus, the shuttle valve becomes active again at increasingly lower flow demands as the cylinder pressure drops.

In broad terms, the shuttle valve opens almost instantly, regardless of the cylinder pressure, downstream pressure or downstream flow demand, in this case at the inlet 11. More precisely, the shuttle piston 73 and return spring 72 act like a fast-acting high-droop regulator, attempting to maintain a few pounds per square inch, typically $\leq 2$ bar, differential pressure across the shuttle valve 13. Thus, as more flow demand is increased, the shuttle valve opens further, retracting the sealing face of the ball bearing 74 from the seal seat 76, and as flow demand decreases it moves in the closed direction.

Figure 9:
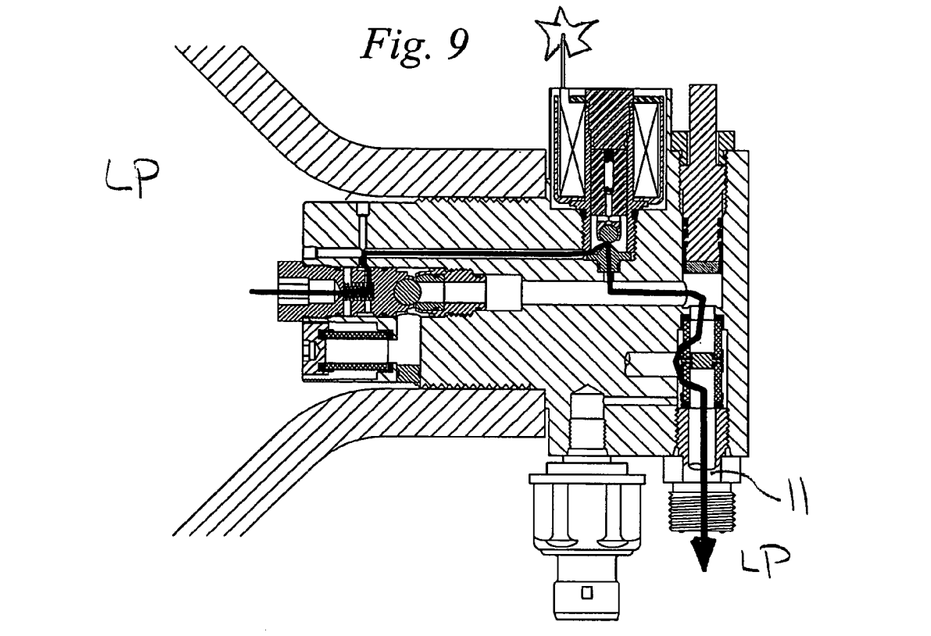
FIG. 9 illustrates the valve during low-flow fluid withdrawal from the cylinder with the shuttle substantially biased closed.

As shown in FIG. 9, as the flow reduces the shuttle valve 13 closes and the flow diminished to flow through the shuttle vent 71, around the shuttle valve 13 to the backpressure passage 17 and through the solenoid valve 20 to the main flow passage 16. At low pressures, the differential pressure across the shuttle valve becomes less significant to provide control and the spring 72 more pertinent. It can be appreciated that the force from return spring 72 affects the valve's delivery characteristics at extremely low cylinder pressures. At some cylinder pressures, the spring rate of spring 72 will generate more force than can be created by the differential pressure across shuttle piston 73. At that pressure, the shuttle piston 73 will not open and the flow control system's output capacity will be limited to the very low capacity of bleed orifice 85. As an example, a typical application having a bleed orifice of 0.006 in. and a shuttle flow diameter of 0.219 in has a capacity ratio of 1332:1, that is a diameter ratio of $0.219 \div 0.006 = 36.5$ and an area ratio$=36.5^2=1332$. Said another way, at the crossover point the flow control system's capacity drops to 0.075% ($1 \div 1332 = 0.00075$) of its previous ability, therefore, serving as an automatic low pressure shut-off.

Figure 10:
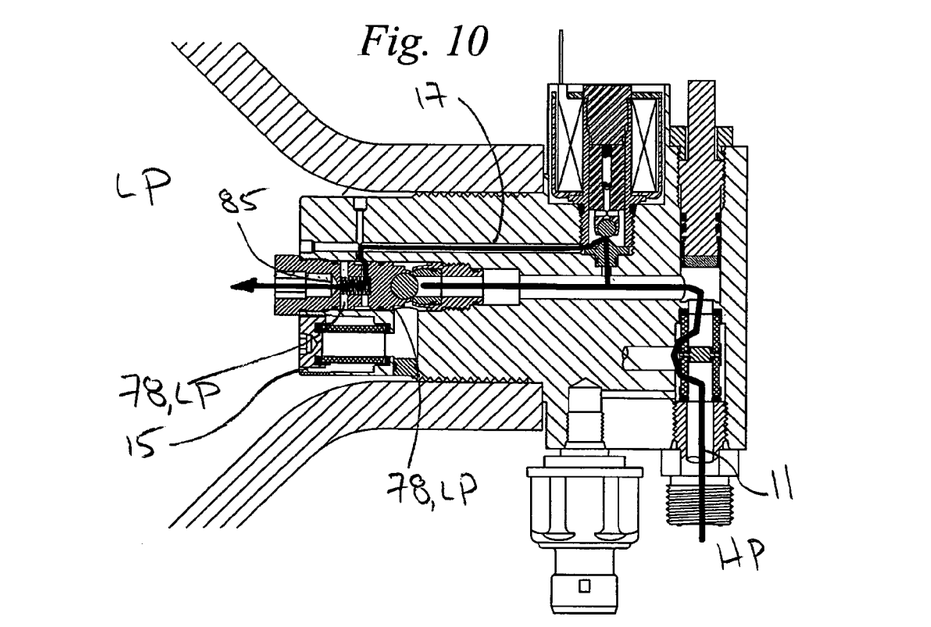
FIG. 10 illustrates the valve during filling of the cylinder where the intended rate is too fast.
Figure 11:
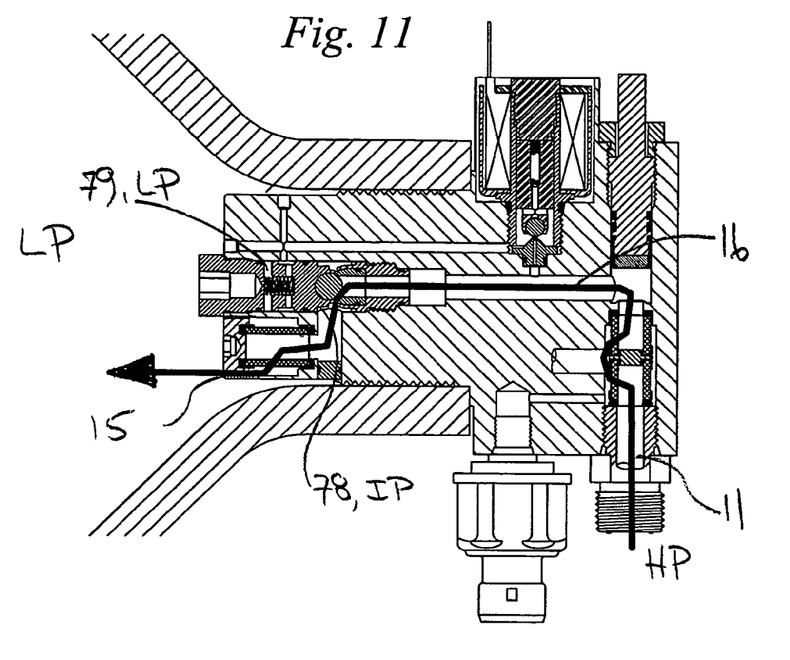
FIG. 11 illustrates the valve during slow filling of the cylinder.

With reference to FIGS. 10 and 11, during filling of the cylinder 6, the shuttle valve 13 opens to enable controlled filling (FIG. 11), however, under filling that is too fast, such as where the pressure at the inlet 11 is at a threshold pressure which is much higher than in the interior 22 of the cylinder 6, then the solenoid valve 20 is driven open which acts to close the shuttle valve 13. More particularly, solenoid spring 38 normally keeps piston 37 in the closed position. If, for example, the diameter of the orifice 43 was 0.012" and the fill pressure in transfer passage 16c was 6500 psig, the gas force acting to open piston 37 is 0.735 pounds. Accordingly, at a maximum design pressure for the cylinder of 6500 psig, the nominal spring force required to maintain the piston 37 in the closed position is 0.735 pounds and a threshold pressure higher than the design pressure would overcome the spring biasing and open the solenoid valve 20.

Accordingly, as shown in FIG. 11, during controlled slow fill situations at high but less than design pressures, the solenoid piston 37 remains closed, the backpressure side 86 of the shuttle piston 73 is at the lower cylinder pressure and opens easily under the high pressure in the transfer passage 16c and the intermediate pressure resulting at the first face 78. Gas flows gas from the inlet 11, through he main flow passage 16, past the shuttle valve 13 and out the cylinder outlet 15.

During the fast fill/over-pressure scenarios of FIG. 10, with threshold pressures greater than 6500 psig for components sized as stated above, solenoid piston 37 is caused to open delivering the fill pressure both the front of the shuttle valve at transfer passage 16c, and to the backpressure sides 86 of the shuttle valve 13 through the shuttle vent 71. As there is no longer differential pressure across the shuttle valve, the shuttle piston 73 is biased closed under the force of the return spring 72 and will not open. As the shuttle valve 13 closes, over-filling or over-pressurization cannot occur. Thus, calibration of the solenoid spring 38 and orifice system 31 prevents over-pressurizing a cylinder 6 in a fast fill situation. In the slow fill scenarios of FIG. 11, where there is no large instantaneous difference between a source pressure and pressure in the cylinder, overfilling or over-pressurization typically does not occur.

Figure 12:
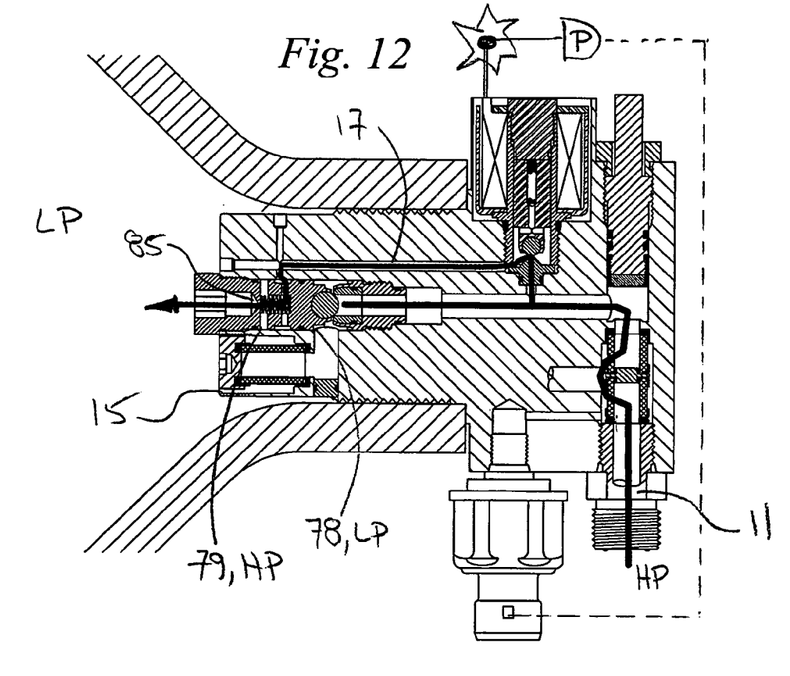
FIG. 12 illustrates the valve which has been closed through controlled actuation of the solenoid.

With reference to FIG. 12, either the application's controller or the filling system's controller (controllers known in the art and are not shown herein) can stop the filling process at any time by energizing the solenoid to open regardless of whether the fill is slow or fast. Opening the solenoid causes the high fill pressure to appear on both sides of the shuttle valve 13 as described above for FIG. 11, balancing the pressures, and allowing the return spring 73 to force the shuttle valve piston 73 to its closed position. In order to facilitate stopping the fill process on demand as described, the optional pressure sensor 24 can be used. If either controller determines that the desired pressure level has been reached at the sensor, it energizes the solenoid valve 20 to open and thus stop filling as described above. More precisely, the filling rate drops from the larger flow rate possible through the shuttle's main orifice through the seal seat 76 to the lower flow rate through the shuttle's bleed orifice 85, being typically a 1000:1 reduction in mass flow rate, if the orifice 85 were sonic at the switchover point. This feature helps achieve full fill and prevents dangerously over-filling cylinders.

Sealing Options

It will be appreciated that embodiments of this invention balance various conflicting design challenges by selecting a sealing solution that is largely geometry based rather than material-compliance based, the principles for which are described in copending application Ser. No. 10/989,308 identified above to applicant. For demanding applications, achieving the spherical piston end of shuttle piston 73 by imbedding a commercial ball bearing in the piston allows exceptional geometry and surface finishes to be readily achieved. In fact, the surface geometry and finish may be improved by more than a 10:1 factor by using ball bearings versus conventional machining or turning.

Specifically, standardized grading allows bearings to be readily specified and purchased, as commodities, based on sphericity and surface finish. For example, ball bearings are available with sphericities ranging from ±3 to ±200 μ-in and surface finishes from 0.5 to 8 μ-in (both ranges correspond to Class 3 to Class 200 grades). By comparison, conventional machining methods would typically generate geometry accuracies of ±500 to 4000 μ-in and surface finishes of 32 to 100 μ-in. Those values are recreated below, in tabular form, in both Metric and Imperial units.

| Production Means | Values in micro-inches (μ-in) | | Values in Micro-meters (μ) | |
|---|---|---|---|---|
| | Geometry | Surface Finish | Geometry | Surface Finish |
| Conventional machining | ±500 to 4000 | 32 to 100 | 12.7 to 102 | 0.8 to 2.5 |
| Ball bearing | ±3 to +200 | 0.5 to 8 | .03 to 5.08 | 0.01 to 0.2 |

These values are relevant in light of specific application requirements. For example, the maximum allowable leak rate for a 350 bar hydrogen valve would occur if a surface imperfection of 5 μ-in existed. It can be concluded, then, that achieving the required seal performance would be borderline or beyond the capability of conventionally machined parts. In other words, the best possible parts would still rely largely on the elastomer seal's compliance to offset the potential leak past native surface imperfections. By contrast, with the ball bearing, geometry alone is likely able to provide the required performance. A Grade 3 ball with sphericity of $\leq \pm 3$ μ-in and a surface finish of $\leq 0.5$ μ-in is likely to seal, leak-tight, against a non-compliant seal of comparable quality. Against a compliant seal, a lower quality ball bearing should still be capable of sealing.

Returning to FIG. 4, seal carrier 75 acts to support and seal elastomeric seal 76. In some applications, however, it may be practical to integrate the function of seal carrier 75 into the valve body 10. The seal carrier 75 comprises an inner diameter 200, an O-ring gland and O-ring 202 for preventing leakage, threads 203 to retain the carrier, a torquing provision 204, such as pin wrench holes as shown, a piloting bore 205 for holding seal 76, a seating stop 206 for seal 76 to rest against, and a rolled over retaining lip 207 which permanently clinches seal 76 in the carrier 75. Alternatively, the seal 76 may be held by a removable threaded collar. The inner diameter 200 of the seal carrier 75 has a common centerline with the ball bearing sealing face 74 for ideal sealing. One approach is to pilot the carrier in the shuttle bore 93 to ensure that the seal 76 and ball 74 are coaxial. Generally, the piloting could occur at either the shuttle bore's diameter 93 or at the sealing diameter 210 of the carrier 75 at O-ring 83. Assembly has been found to be easier when piloting on the smaller diameter 210. Seal carrier 75 is made from an appropriate metal such as brass.

Seal 76 is preferably a plastic material. In high pressure applications, Dupont SCP 50000® has been found to be quite effective having a tensile strength of approximately 32,600 psi. Seal 76 comprises a spherical sector 211, found to be a good profile for the clinching operation, a flat frontal face 212, a sharp edged circular intersection 213 between face 212 and central bore 214, O-ring gland and O-ring 215, and bottom face 216, which rests against seating stop 206. Engineering plastics, particularly useful in embodiments of the invention, are now available which have a wide range of tensile strengths, compressive strengths and creep tendencies. In an extreme example, polyimides, such as Dupont SCP-50000® having tensile strengths of approximately 30,000 psi or greater and substantially no creep tendencies, are available. Such engineered plastics can be used, unsupported, in very high pressure solenoids. Appropriate selection of the material and the seal height constrains the seal's strain range within acceptable limits across a wide range of pressures, while maintaining compatibility with fill fluid characteristics.

The embodiments of the invention for which an exclusive property or privilege is claimed are defined as follows:

1. A flow control system for a valve comprising:
    a valve body having a main flow passage connecting a first area at a first pressure to a second area at a second pressure;
    a first shuttle valve having a first shuttle face and a backpressure face, the shuttle face having a seal face operative for opening and closing the main flow passage, the shuttle face being in communication with the main flow passage between the seal face and the second area, the shuttle valve being biased for closing the main flow passage;
    a backpressure passage extending between the first area and the backpressure face and having a metering orifice therealong;
    a bleed passage extending between the second area and the backpressure face and having a bleed orifice therealong;
    a second valve operable for opening and closing the metering orifice wherein
        when the metering orifice is closed, the biased shuttle valve is operable under differential pressure between the first area and the second area, and
        when the metering orifice is open, metered flow through the metering orifice exceeds bleed flow through the bleed orifice and the backpressure face equilibrates to an intermediate pressure between the first and second pressures, and the biased shuttle valve is operable under differential pressure between the first area, the second area and the backpressure face.

2. The flow control system of claim 1 wherein the second valve is biased to close the metering orifice, the system further comprising a solenoid operable for opening the metering orifice.

3. The flow control system of claim 1 wherein:
    the first pressure at the first area is at a high pressure which is greater than a low pressure at the second pressure at the second area for directing flow from the first area to the second area, and
    when the metering orifice is closed, the differential pressure across the seal face opens the shuttle valve enabling flow along the main flow passage, and
    when the metering orifice is open, pressure at the backpressure face equilibrates to an intermediate pressure between the low pressure in the second area and the high pressure in the first area for establishing a differential pressure across the biased shuttle valve for closing the shuttle valve, disabling flow along the main flow passage.

4. The flow control system of claim 3 wherein the metering orifice is opened when the high pressure at the first area exceeds a threshold pressure.

5. The flow control system of claim 4 wherein the second valve is biased closed and the metering orifice is sized so that the threshold pressure on the second valve exceeds the biasing thereon.

6. The flow control system of claim 5 wherein the second valve is a solenoid valve and wherein flow is enabled along the main flow passage by actuating the solenoid for opening the metering orifice.

7. The flow control system of claim 6 wherein the solenoid valve is actuated on demand from a sensor at the first area.

8. The flow control system of claim 1 wherein:
    the first pressure at the first area is at a low pressure which is less than the second pressure which is at a high pressure at the second area for directing flow from the second area to the first area, and
    when the metering orifice is closed, pressure at the backpressure face equilibrates through the bleed passage to the high pressure at the second area and the shuttle valve is biased closed for disabling flow along the main flow passage, and
    when the metering orifice is open, pressure at the backpressure face equilibrates through the bleed passage and the backpressure passage to an intermediate pressure between the high pressure in the second area and the low pressure in the first area for establishing a pressure differential across the biased shuttle valve for opening the shuttle valve and enabling flow along the main flow passage.

9. The flow control system of claim 8 wherein the second valve is a solenoid valve wherein flow is enabled along the main flow passage by actuating the solenoid for opening the metering orifice.

10. The flow control system of claim 9 wherein the solenoid valve is actuated on demand.

11. The flow control system of claim 1 wherein the first area is fit with a first filter for cleaning the flow through the main flow passage.

12. The flow control system of claim 11 wherein the second area is fit with a second filter for cleaning the flow through the main flow passage.

13. The flow control system of claim 12 wherein the first and second filters comprises tubular filter elements having a bore and forming an annulus therearound, the filter elements having a barrier in the bore for directing flow from the bore through the filter and at least into the annulus.

14. The flow control system of claim 1 further comprising a manual shutoff valve in the main flow passage, the shutoff valve further comprising:
    an annular seat formed in the main flow passage; and
    a valve stem having a seal at a distal end thereof for cooperating with the seat for manually closing the main flow passage,
    wherein the seal is an elastomer retained axially to the stem with a tubular retaining sleeve providing radial and axial support to the elastomer.

15. The flow control system of claim 1 wherein
    the valve body is fit to a cylinder,
    the first area is a fluid distribution system, and
    the second area is the cylinder.

16. The flow control system of claim 15 wherein the second valve is a solenoid valve which is biased closed and opened by actuating the solenoid for opening the metering orifice so as to stop filling of the cylinder with fluid from the fluid distribution system, and wherein:
    the fluid distribution system is at a high pressure which is greater than a low pressure in the cylinder for directing fluid flow from the fluid distribution system to the cylinder, and
    when the metering orifice is closed, the differential pressure across the shuttle valve opens the shuttle valve enabling flow along the main flow passage to fill the cylinder, and
    when the metering orifice is open, pressure at the backpressure face equilibrates to an intermediate pressure between the low pressure in the cylinder and the high pressure in the fluid distribution system for establishing a differential pressure across the shuttle valve for closing the shuttle valve and stopping filling of the cylinder through the main flow passage.

17. The flow control system of claim 16 wherein the metering orifice is sized so that the threshold pressure on the second valve exceeds the biasing thereon.

18. The flow control system of claim 16 wherein the solenoid valve is actuated on demand from a sensor at the fluid distribution system.

19. The flow control system of claim 15 wherein the second valve is a solenoid valve which is biased closed and opened by actuating the solenoid for opening the metering orifice so as to enable withdrawal of fluid from the cylinder, and wherein:
the fluid distribution system is at a low pressure which is less than a high pressure in the cylinder for withdrawing fluid from the cylinder to the fluid distribution system, and
when the metering orifice is closed, pressure at the backpressure face equilibrates to the high pressure and the first valve is biased closed for preventing withdrawal of fluids from the main flow passage, and
when the metering orifice is open, pressure at the backpressure face equilibrates through the bleed passage and the backpressure passage to an intermediate pressure between the high pressure in the cylinder and the low pressure in the fluid distribution system while the first face remains at the high pressure for establishing a pressure differential across the shuttle valve for opening the first valve and enabling flow along the main flow passage to the fluid distribution system.

20. The flow control system of claim 1 wherein the main flow passage has a seal seat and wherein the seal face is a hemispherical face wherein the shuttle valve, the hemispherical face, the seal seat have a common centerline.

21. The flow control system of claim 20 wherein the main flow passage has a seal carrier for supporting the seal seat and wherein the seal carrier and seal set have the same centerline.

22. A flow control system for a valve comprising:
a valve body having a main flow passage communicating between a first pressure area and a second pressure area which is in a vessel;
a first valve, in the main flow passage, having a shuttle piston normally biased closed and operable to open and close a first seal in the main flow passage, wherein the first seal has first pressure area opening forces formed thereon and the shuttle piston is further operable under differential pressure between a first face and a second backpressure face, the first being positioned intermediate the first seal and the vessel and in communication with the second pressure area;
a backpressure passage extending between the first pressure area and the second backpressure face of the shuttle piston and having a metering orifice therealong;
a bleed passage extending between the vessel and the second backpressure face and having a bleed orifice therealong; and
a second valve actuable to open and close the metering orifice, wherein when the second valve is actuated to open the metering orifice, flow through the metering orifice exceeds flow through the bleed orifice wherein the second backpressure face of the shuttle piston operates at an intermediate pressure between the first pressure area and second pressure area, and when the second valve is actuated to close the metering orifice, the second backpressure face of the shuttle piston communicates with the second pressure area, wherein the first valve is operable to open and close by the biasing on the shuttle piston, by first pressure area opening forces at the first seal and by differential pressure across the first face and second backpressure face of the shuttle piston.

23. The flow control system of claim 22 wherein, for controlling flow from the vessel,
the second pressure in the vessel is at a high pressure and the first pressure is at a low pressure, and
when the second valve is actuated to open the metering orifice, the intermediate pressure at the second backpressure face is lower than the second pressure at the first face and the differential pressure across the shuttle piston overcomes the biasing and the first valve opens to regulate flow through the main flow passage.

24. The flow control system of claim 22 wherein, for controlling flow from the vessel,
the second pressure in the vessel is at a low pressure and the first pressure is at a low pressure being lower than the second pressure, and
when the second valve is actuated to open the metering orifice, the intermediate pressure at the second backpressure face is lower than the second pressure at the first face, the differential pressure across the shuttle piston is insufficient to overcome the biasing and the first valve closes the main flow passage.

25. The flow control system of claim 22 wherein, for controlling flow into the vessel,
the second pressure in the vessel is lower the first pressure is at a high pressure, the second pressure forming an opening force on the first seal to open the first valve, and
when the second valve opens the metering orifice, the intermediate pressure at the second backpressure face is higher than the second pressure at the first face and the differential pressure across the shuttle piston overcomes the opening force at the first seal to close the main flow passage.

26. The flow control system of claim 22 wherein, for controlling flow into the vessel,
the second pressure in the vessel is lower the first pressure is at a high pressure, the second pressure forming an opening force on the first seal to open the first valve, and
when the metering orifice is closed, the pressure at the second backpressure face is about the same as the second pressure at the first face, and the opening force at the first seal overcomes the differential pressure across the shuttle piston and regulates flow through the main flow passage.

27. The flow control system of claim 22 wherein, for controlling flow into the vessel,
the second valve is normally biased to the closed position,
the second pressure in the vessel is lower pressure than the first pressure which is at a high over-pressure, the first pressure forming a first opening force on the first seal to open the first valve and forming a second opening force on the second valve to open the metering orifice, and
when the metering orifice opens under the second opening force to connect the backpressure passage with the first pressure, the intermediate pressure at the second backpressure face is higher than the second pressure at the first face and the biasing and differential pressure across the shuttle piston overcomes the first opening force at the first seal for closing the first valve.

* * * * *